United States Patent
Oishi et al.

(10) Patent No.: US 12,461,193 B2
(45) Date of Patent: Nov. 4, 2025

(54) CONTROL DEVICE, CONTROL SYSTEM, AND PROGRAM

(71) Applicant: KABUSHIKI KAISHA TOKAI RIKA DENKI SEISAKUSHO, Aichi (JP)

(72) Inventors: Yoshiki Oishi, Aichi (JP); Satoshi Mori, Aichi (JP); Kenichi Koga, Aichi (JP); Tatsuya Koike, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 284 days.

(21) Appl. No.: 17/907,794

(22) PCT Filed: Feb. 1, 2021

(86) PCT No.: PCT/JP2021/003505
§ 371 (c)(1),
(2) Date: Aug. 29, 2022

(87) PCT Pub. No.: WO2021/250927
PCT Pub. Date: Dec. 16, 2021

(65) Prior Publication Data
US 2023/0132672 A1    May 4, 2023

(30) Foreign Application Priority Data
Jun. 11, 2020   (JP) ................. 2020-101428

(51) Int. Cl.
*G01S 5/14*    (2006.01)
*B60R 25/24*   (2013.01)
*G01S 5/02*    (2010.01)

(52) U.S. Cl.
CPC ............. *G01S 5/14* (2013.01); *B60R 25/24* (2013.01); *G01S 5/0221* (2013.01)

(58) Field of Classification Search
CPC . G01S 5/14; G01S 5/0221; G01S 5/12; G01S 5/0284; G01S 5/02; G01S 5/0294;
(Continued)

(56) References Cited

U.S. PATENT DOCUMENTS

| 2019/0364391 A1 | 11/2019 | Yamaguchi et al. | |
| 2020/0233072 A1* | 7/2020 | Osai | G07C 9/00309 |
| 2022/0001836 A1* | 1/2022 | Baek | G01S 13/878 |

FOREIGN PATENT DOCUMENTS

| JP | 2012-172334 A | 9/2012 |
| WO | 2015/176776 A1 | 11/2015 |
| WO | 2018/168538 A1 | 9/2018 |

OTHER PUBLICATIONS

International Search Report issued in International Bureau of WIPO Patent Application No. PCT/JP2021/003505, dated Apr. 13, 2021, along with an English translation thereof.

* cited by examiner

*Primary Examiner* — Vladimir Magloire
*Assistant Examiner* — Remash R Guyah
(74) *Attorney, Agent, or Firm* — GREENBLUM & BERNSTEIN, P.L.C.

(57) ABSTRACT

There are provided a control device, a control system, and a program that can improve position estimation precision. A control device includes a control section configured to obtain a distance measurement value, and estimate a relative position of the position changeable type communication device with respect to a target space based on the distance measurement value, the distance measurement value being obtained when a position fixed type communication device and the position changeable type communication device perform wireless communication, and indicating a distance between the position fixed type communication device and the position changeable type communication device, the
(Continued)

position fixed type communication device being fixed to a position that is inside the target space, and is closer to a floor part than to a ceiling part of the target space, and the relative position of the position changeable type communication device with respect to the target space being changeable.

11 Claims, 5 Drawing Sheets

(58) Field of Classification Search
CPC . G01S 13/00; G01S 11/00; G01S 5/00; G01S 13/74; G01S 3/48; G01S 11/02; G01S 13/42; B60R 25/24; B60R 25/245; B60R 25/00; E05B 49/00; E05B 77/48; E05B 81/78; G07C 9/00309; G07C 2009/00793; G07C 2209/64; G07C 9/00658; H04B 1/00; H04W 4/00; H04W 28/18; H04W 24/08; H04W 64/006; H04L 7/042; H04L 1/0003; H04L 25/0204; H04L 25/0224; H04L 25/0212
USPC .......... 342/451, 450, 463; 340/5.61, 539.13, 340/426.19; 702/2; 455/456.1
See application file for complete search history.

CONTROL DEVICE, CONTROL SYSTEM, AND PROGRAM

TECHNICAL FIELD

The present invention relates to a control device, a control system, and a program.

BACKGROUND ART

In recent years, a technology where one device estimates a position of an other device according to a result of transmission/reception of a signal between the devices has been developed. As an example of a position estimation technology, following Patent Literature 1 discloses a technology where a UWB receiver estimates an arrival angle of a wireless signal from a UWB transmitter by performing wireless communication using an Ultra-Wide Band (UWB). Furthermore, in another example of the position estimation technology, a distance between devices is measured by performing wireless communication, and position estimation is performed by using the distance.

CITATION LIST

Patent Literature

Patent Literature 1: WO 2015/176776

SUMMARY OF INVENTION

Technical Problem

However, there has been a task that, when there is a shield between devices, communication is not performed well, and measurement precision of a target that needs to be measured deteriorates as a result.

Accordingly, the present invention is made in view of the aforementioned issue, and an object of the present invention is to provide a mechanism that can improve position estimation precision.

Solution to Problem

To solve the above problem, according to an aspect of the present invention, there is provided a control device comprising a control section configured to obtain a distance measurement value, and estimate a relative position of a position changeable type communication device with respect to a target space based on the distance measurement value, the distance measurement value being obtained when a position fixed type communication device and the position changeable type communication device perform wireless communication, and indicating a distance between the position fixed type communication device and the position changeable type communication device, the position fixed type communication device being fixed to a position that is inside the target space that is a space partitioned by an object, and is closer to a floor part than to a ceiling part of the target space, and the relative position of the position changeable type communication device with respect to the target space being changeable.

To solve the above problem, according to another aspect of the present invention, there is provided a control system comprising:

a position fixed type communication device that is fixed to a position that is inside a target space that is a space partitioned by an object, and is closer to a floor part than to a ceiling part of the target space; and a control device configured to obtain a distance measurement value, and estimate a relative position of a position changeable type communication device with respect to the target space based on the distance measurement value, the distance measurement value being obtained when the position fixed type communication device and the position changeable type communication device perform wireless communication, and indicating a distance between the position fixed type communication device and the position changeable type communication device, and the relative position of the position changeable type communication device with respect to the target space being changeable.

To solve the above problem, according to another aspect of the present invention, there is provided a program causing a computer to function as a control section configured to obtain a distance measurement value, and estimate a relative position of a position changeable type communication device with respect to a target space based on the distance measurement value, the distance measurement value being obtained when a position fixed type communication device and the position changeable type communication device perform wireless communication, and indicating a distance between the position fixed type communication device and the position changeable type communication device, the position fixed type communication device being fixed to a position that is inside the target space that is a space partitioned by an object, and is closer to a floor part than to a ceiling part of the target space, and the relative position of the position changeable type communication device with respect to the target space being changeable.

Advantageous Effects of Invention

As described above, the present invention can improve position estimation precision.

DESCRIPTION OF EMBODIMENTS

A preferred embodiment of the present invention will be described in detail below with reference to the accompanying drawings. Note that components employing substantially identical functional configurations will be assigned the same reference numerals in this description and the drawings, and overlapping description thereof will be omitted.

<<1. Outline>>

Figure 1:
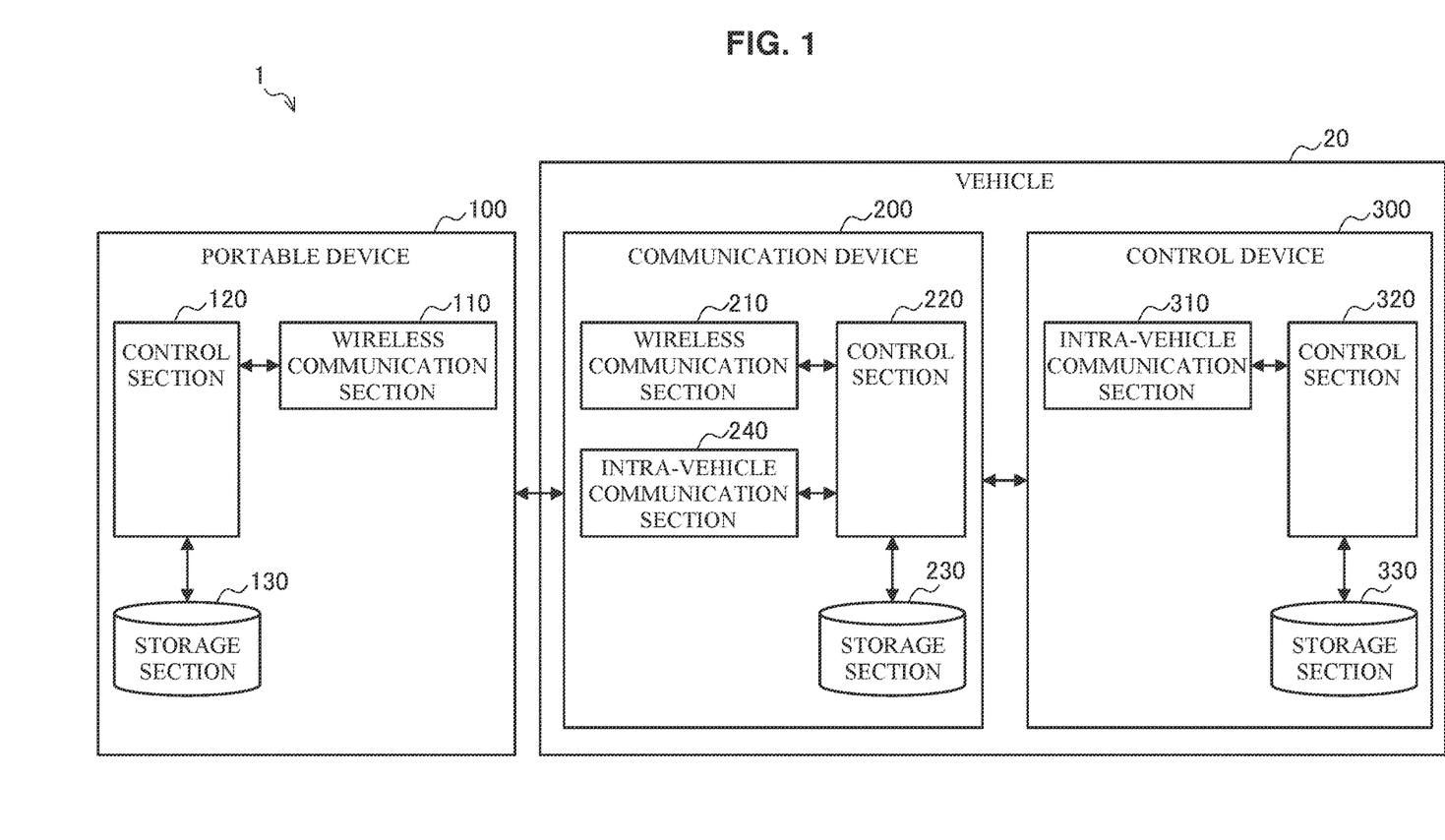
FIG. 1 is a diagram illustrating an example of a configuration of a system according to an embodiment of the present invention.

FIG. 1 is a diagram illustrating an example of a configuration of a system 1 according to an embodiment of the present invention. As illustrated in FIG. 1, the system 1 according to the present embodiment includes a portable device 100, a communication device 200 that is mounted on a vehicle 20, and a control device 300. The vehicle 20 is an example of a movable body that is a use target (target) of a user.

An authenticatee side device and an authentication side device that performs an authentication process of authenticating the device by using information obtained by communicating with the authenticatee device are involved in the present invention. In an example illustrated in FIG. 1, the portable device 100 is an example of the authenticatee side device, and the control device 300 is an example of the authentication side device.

According to the system 1, when, for example, the user who is a driver of the vehicle 20 approaches the vehicle 20 carrying the portable device 100, the portable device 100 and the communication device 200 perform wireless communication for authentication. Furthermore, when the control device 300 performs the authentication process by using the information obtained by the communication device 200, and authentication succeeds, a door lock of the vehicle 20 is unlocked, a light is turned on, or an engine is started under control of the control device 300, and the vehicle 20 becomes available for the user. This system 1 is also referred to as a smart entry system. Each component will be described below in order.

<1.1. Portable Device 100>

The portable device 100 is configured as an arbitrary control device. An example of the arbitrary control device includes devices such as electronic keys, smartphones, and wearable terminals that a user of a movable body carries to use. As illustrated in FIG. 1, the portable device 100 includes a wireless communication section 110, a control section 120, and a storage section 130.

(Wireless Communication Section 110)

The wireless communication section 110 has a function of performing communication that conforms to predetermined wireless communication standards with the communication device 200. The predetermined wireless communication standards may use, for example, a signal of a Radio Frequency (RF) band and a signal of a Low Frequency (LF) band. Alternatively, a signal of Bluetooth Low Energy (BLE (registered trademark)) may be transmitted. Alternatively, a signal that uses the Ultra-Wide Band (UWB) may be used.

Note a signal of an impulse system that uses the UWB has characteristics of making it possible to perform precise distance measurement. That is, the signal of the impulse system that uses UWB makes it possible to precisely measure an air propagation time of a radio wave by using the radio wave of a very short pulse width equal to or less than a nanosecond, and perform precise distance measurement based on the propagation time. The air propagation time is a time taken until a radio wave is received after the radio wave is transmitted. In this regard, distance measurement refers to measuring a distance between devices that transmit and receive a signal. The wireless communication section 110 is configured as, for example, an interface that can transmit and receive a signal that uses the UWB.

Note that the signal that uses the UWB can be transmitted as, for example, a distance measurement signal, an angle estimation signal, and a data signal. The distance measurement signal is a signal that is transmitted and received during a distance measurement process described below. The distance measurement signal may include a frame format that does not have a payload part in which data is stored, or may include, for example, a frame format that has a payload part. The angle estimation signal is a signal that is transmitted and received during an angle estimation process described below. The angle estimation signal may employ the same configuration as that of the distance measurement signal. A data signal preferably includes, for example, a frame format that has a payload part in which data is stored.

In this regard, the wireless communication section 110 includes at least one antenna. Furthermore, the wireless communication section 110 transmits and receives a wireless signal via at least one antenna.

(Control Section 120)

The control section 120 has a function of controlling all operations of the portable device 100. In an example, the control section 120 controls the wireless communication section 110, and communicates with the communication device 200. Furthermore, the control section 120 reads information from the storage section 130, and writes information in the storage section 130. The control section 120 is configured as an electronic circuit such as a Central Processing Unit (CPU) and a microprocessor.

(Storage Section 130)

The storage section 130 has a function of storing various pieces of information for the operations of the portable device 100. For example, the storage section 130 stores programs for the operations of the portable device 100, and an Identifier (ID), a password, and an authentication algorithm for authentication. The storage section 130 includes, for example, a storage medium such as a flash memory, and a processing device that executes recording and playback with respect to a storage medium.

The configuration example of the portable device 100 has been specifically described above. Note that the configuration illustrated in FIG. 1 is an example, and the configuration of the portable device 100 is not limited to this. For example, the portable device 100 may employ a configuration further including, for example, an operation section that accepts a user's operation of the portable device 100, a sensor section that detects a motion of the portable device 100 and sounds in surroundings, a sound output section that outputs a sound, or a vibration section that vibrates the portable device 100.

<1.2. Communication Device 200 and Control Device 300>

The communication device 200 and the control device 300 are provided in association with the vehicle 20. In this regard, the communication device 200 is, for example, installed inside a vehicle compartment of the vehicle 20 or built in the vehicle 20 as a communication module, that is, the communication device 200 is mounted on the vehicle 20. In addition, for example, the control device 300 may be provided in a parking lot of the vehicle 20, that is, the vehicle 20 and the control device 300 may be configured as separate devices. In this case, the control device 300 can wirelessly transmit a control signal to the vehicle 20 based on a communication result of the portable device 100 and the communication device 200, and remotely control the vehicle 20. The vehicle 20 may be provided with the plurality of communication devices 200.

(Communication Device 200)

The communication device 200 is a device that performs wireless communication with the portable device 100. As illustrated in FIG. 1, the communication device 200 includes a wireless communication section 210, a control section 220, a storage section 230, and an intra-vehicle communication section 240.

The wireless communication section 210 has a function of performing communication that conforms to predetermined wireless communication standards with the wireless communication section 110 of the portable device 100. The wireless communication section 210 wirelessly receives a signal from the portable device 100. Furthermore, the wireless communication section 210 wirelessly transmits a signal to the portable device 100. The wireless communication section 210 is configured as, for example, a communication interface that can perform communication using the UWB.

In this regard, the wireless communication section 210 includes at least one antenna. Furthermore, the wireless communication section 210 transmits and receives wireless signals via the at least one antenna.

The control section 220 has a function of controlling operations of the communication device 200. In an example, the control section 220 controls the wireless communication section 210, and communicates with the portable device 100. In another example, the control section 220 controls the intra-vehicle communication section 240, and communicates with another device provided in association with the vehicle 20. In another example, the control section 220 reads information from the storage section 230, and writes information in the storage section 230. The control section 220 is configured as, for example, an Electronic Control Unit (ECU).

The storage section 230 has a function of storing various pieces of information for operations of the communication device 200. For example, the storage section 230 stores programs for the operations of the communication device 200, and an Identifier (ID), a password, and an authentication algorithm for authentication. The storage section 230 includes, for example, a storage medium such as a flash memory, and a processing device that executes recording and playback with respect to a storage medium.

The intra-vehicle communication section 240 has a function of communicating with another device provided in association with the vehicle 20. In an example, the intra-vehicle communication section 240 communicates with the control device 300. The intra-vehicle communication section 240 is configured as a communication interface that can perform communication that conforms to standards of an arbitrary in-vehicle network such as a Local Interconnect Network (LIN) or a Controller Area Network (CAN).

(Control Device 300)

The control device 300 is a device that executes communication with the communication device 200. As illustrated in FIG. 1, the control device 300 includes an intra-vehicle communication section 310, a control section 320, and a storage section 330.

The intra-vehicle communication section 310 has a function of communicating with another device provided in association with the vehicle 20. In an example, the intra-vehicle communication section 310 communicates with the communication device 200. The intra-vehicle communication section 310 is configured as a communication interface that can perform communication that conforms to standards of an arbitrary in-vehicle network such as a Local Interconnect Network (LIN) or a Controller Area Network (CAN).

The control section 320 has a function of controlling operations of the control device 300. In an example, the control section 320 controls the intra-vehicle communication section 310, and communicates with the another device provided in association with the vehicle 20. In another example, the control section 320 reads information from the storage section 330, and writes information in the storage section 330. The control section 320 is configured as, for example, an electronic circuit such as an Electronic Control Unit (ECU).

Above all, the control section 320 executes a process that is based on information obtained by wireless communication between the communication device 200 and the portable device 100. An example of the process is an authentication process of authenticating the portable device 100. Furthermore, in another example of the process, the control section 320 functions as a door lock control section, too, that controls the door lock of the vehicle 20, and locks and unlocks the door lock. Furthermore, in another example of the process, the control section 320 functions as an engine control section, too, that controls the engine of the vehicle 20, and starts/stops the engine. Note that a power supply equipped to the vehicle 20 may be, for example, a motor in addition to the engine. Furthermore, in another example of the process, the control section 320 performs control to turn on and turn off lights provided to the vehicle 20. Furthermore, in another example of the process, the control section 320 performs control to start/stop electric power distribution to predetermined electric components provided to the vehicle 20. The predetermined electric components include, for example, air conditioners, car audios, and car navigation devices.

The storage section 330 has a function of storing various pieces of information for the operations of the control device 300. For example, the storage section 330 stores programs for the operations of the control device 300, and an Identifier (ID), a password, and an authentication algorithm for authentication. The storage section 330 includes, for example, a storage medium such as a flash memory, and a processing device that executes recording and playback with respect to a storage medium.

The example of the configuration of this system 1 has been specifically described above. Note that a wireless signal transmitted and received between the portable device 100 and the communication device 200 is transmitted and received in an arbitrary frequency band. The wireless signal is not limited to a signal that uses the UWB, and, for example, may be transmitted as a signal of a Low Frequency (LF) band, may be transmitted as a signal of a Radio Frequency (RF) band, or may be transmitted as a signal of Bluetooth Low Energy (BLE (registered trademark)). Furthermore, the portable device 100 and the communication device 200 may further include wireless communication sections that transmit and receive wireless signals by communication of a different frequency band in addition to the wireless communication sections that transmit and receive signals that use the UWB.

<<2. Estimation of Position Parameters>>

The control device 300 according to the present embodiment performs an estimation process of estimating position parameters that indicate a position at which the portable device 100 exists.

The position parameters can include a distance between the portable device 100 and the communication device 200 that is mounted on the vehicle 20. The distance is, for example, a distance from an origin of a local coordinate system of the communication device 200 to the portable device 100. In the present embodiment, the local coordinate system of the communication device 200 may be set as a coordinate system in which the communication device 200 serves as a reference point. The communication device 200 includes a plurality of antennas. An example of the local coordinate system of the communication device 200 is a coordinate system where a center of the plurality of antennas of the communication device 200 is the origin, a front-back direction of the vehicle 20 is an X axis, a left-right direction of the vehicle 20 is a Y axis, and an upper-lower direction of the vehicle 20 is a Z axis. An arrangement shape of the plurality of antennas is not limited in particular.

A distance between the portable device 100 and the communication device 200 is estimated based on a below-described result of transmission and reception of a distance measurement signal performed between the portable device 100 and the communication device 200.

Furthermore, the position parameters can include an angle at which a signal transmitted from the portable device 100 arrives at the communication device 200. The angle is an angle of the portable device 100 for which the communication device 200 serves as the reference point. For example, the angle is an angle formed between a straight line that connects the origin of the local coordinate system of the communication device 200 and the portable device 100, and the coordinate axes of the local coordinate system.

Furthermore, the position parameters can include coordinates of the portable device 100 in a predetermined coordinate system. The predetermined coordinate system may be the local coordinate system of the communication device 200. For example, a coordinate x on the X axis, a coordinate y on the Y axis, and a coordinate z on the Z axis in the local coordinate system indicate three-dimensional coordinates (x, y, z) of the portable device 100.

<2.1. Distance Measurement Process>

The control device 300 performs a distance measurement process. The distance measurement process is a process of estimating a distance between the communication device 200 and the portable device 100. The distance measurement process includes transmitting and receiving a distance measurement signal, and calculating a distance R based on an air propagation time of the distance measurement signal. The air propagation time is a time taken until a signal is received after the signal is transmitted. The control device 300 can obtain, from the communication device 200, information obtained when the communication device 200 and the portable device 100 communicate, and perform the distance measurement process.

During the distance measurement process, a plurality of distance measurement signals can be transmitted and received between the communication device 200 and the portable device 100. A distance measurement signal transmitted from one device to an other device among the plurality of distance measurement signals is also referred to as a first distance measurement signal. Next, a distance measurement signal transmitted as a response to the first distance measurement signal from the device that has received the first distance measurement signal to the device that has transmitted the first distance measurement signal is also referred to as a second distance measurement signal.

An example of the distance measurement process will be described. For example, the portable device 100 first transmits a distance measurement trigger signal that instructs start of distance measurement. Next, the communication device 200 that has received the distance measurement trigger signal transmits the first distance measurement signal. Next, the portable device 100 that has received the first distance measurement signal transmits the second distance measurement signal a specified time (ΔT1) after receiving the first distance measurement signal. The communication device 200 measures a time ΔT1 from a transmission time of the first distance measurement signal to a reception time of the second distance measurement signal. The reception time of the second distance measurement signal is a reception time of a first arrival wave of the second distance measurement signal. The control device 300 calculates the distance between the portable device 100 and the communication device 200 based on known ΔT1 and measured ΔT2. More specifically, the control device 300 calculates a time taken for one-way transmission/reception of a signal by dividing by 2 a value obtained by subtracting ΔT1 from ΔT2, and calculates the distance between the portable device 100 and the communication device 200 by multiplying this time with a signal speed. Note that the time ΔT1 may not be known for the control device 300. For example, the portable device 100 may measure the time ΔT1, and report the time ΔT1 to the communication device 200. This report can be performed by transmitting a data signal including information obtained by encrypting information that indicates the time ΔT1.

<2.2. Angle Estimation>

The control device 300 performs an angle estimation process. For example, the angle estimation process includes receiving an angle estimation signal, and calculating an angle based on a reception result of the angle estimation signal. The angle estimation signal is a signal that is transmitted and received by the angle estimation process.

First, the portable device 100 transmits the angle estimation signal. Next, the wireless communication section 210 of the communication device 200 receives the angle estimation signal. The control section 320 of the control device 300 estimates an Angle of Arrival (AoA) based on the angle estimation signal received by the wireless communication section 210.

—Supplementary Explanation

Note that the angle estimation signal may be the same as the distance measurement signal. In this case, when the communication device 200 receives one wireless signal that functions as both of the angle estimation signal and the second distance measurement signal, the control device 300 can calculate the distance between the communication device 200 and the portable device 100 and the angle of the portable device 100 with respect to the communication device 200.

<2.3. Coordinate Estimation>

The control device 300 performs a coordinate estimation process. The coordinate estimation process is a process of estimating three-dimensional coordinates (x, y, z) of the portable device 100. The control device 300 calculates the coordinates x, y, and z based on, for example, results of the distance measurement process and the angle estimation process. Furthermore, in a case where the plurality of communication devices 200 are mounted on the vehicle 20, the control device 300 can also calculate the coordinates x, y, and z based on the distance between each communication device 200 and the portable device 100. Mounting positions of the plurality of communication devices 200 are not limited in particular, yet may be provided at, for example, an end part on a traveling direction side of the vehicle 20 and an end part on an opposite direction side to the traveling direction of the vehicle. Coordinates of the portable device 100 estimated by the coordinate estimation process may be two-dimensional coordinates (x, y).

Note that, by combining coordinates of the portable device 100 in the local coordinate system and coordinates of the origin of the local coordinate system in a global coordinate system, it is also possible to estimate the coordinates of the portable device 100 in the global coordinate system, too.

<2.4. Decision on Existence Area>

Estimation of the position parameters includes deciding an existence area. The control section 320 of the control device 300 can decide an area in which the portable device 100 exists among a plurality of areas defined in advance. In an example, in a case where an area is defined based on a distance from the communication device 200, the control section 320 decides the area in which the portable device 100 exists based on the distance estimated by the distance measurement process. In another example, in a case where an area is defined by an angle from the communication device 200, the control section 320 decides the area in which the portable device 100 exists based on the angle estimated by the angle estimation process. In another example, in a case where an area is defined by three-dimensional coordinates, the control section 320 decides the area in which the portable device 100 exists based on the coordinates (x, y, z) estimated by the coordinate estimation process.

Additionally, as a process unique to the vehicle 20, the control section 320 may estimate an area in which the portable device 100 exists from a plurality of areas including an inside of the vehicle compartment and an outside of the vehicle compartment of the vehicle 20. For example, the control section 320 may decide in which one area of the inside of the vehicle compartment and the outside of the vehicle compartment of the vehicle 20 the portable device 100 exists. Consequently, it is possible to provide different services between a case where the user is inside the vehicle compartment and a case where the user is outside the vehicle compartment. Additionally, the control section 320 may specify the area in which the portable device 100 exists from a surrounding area that is an area within a predetermined distance from the vehicle 20 and a distant area that is an area that is the predetermined distance or more from the vehicle 20.

<2.5 Usage of Estimation Result of Position Parameters>

The estimation result of the position parameters can be used to, for example, authenticate the portable device 100. When, for example, the portable device 100 exists in an area on a driver's seat side and at a close distance from the communication device 200, the control section 320 decides success of authentication, and unlocks the door. Furthermore, when the portable device exists in an intra-vehicle compartment area, the control section 320 decides success of authentication, and permits to start the engine.

<<3. Technical Task>>

Figure 2:
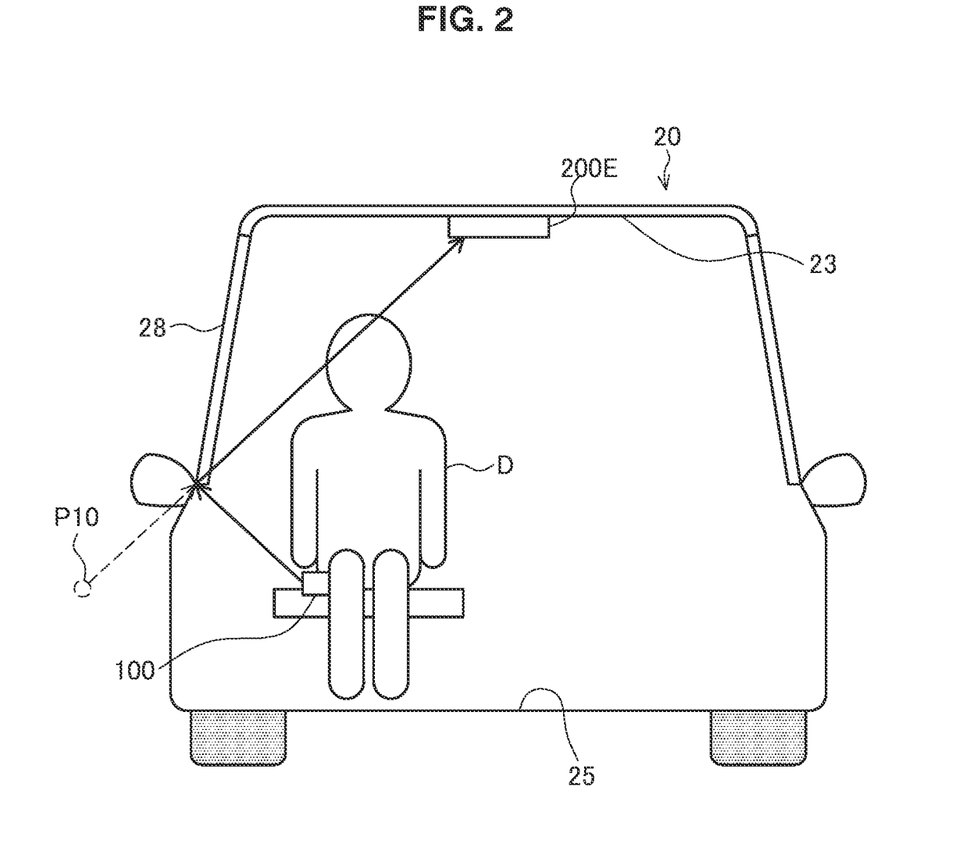
FIG. 2 is a view for explaining a technical task according to the present embodiment.

A technical task of the present embodiment will be described with reference to FIG. 2. FIG. 2 is a view for explaining the technical task of the present embodiment. As illustrated in FIG. 2, the vehicle 20 includes a ceiling part 23 and a floor part 25. Furthermore, a side surface part that connects the ceiling part and the floor part 25 is provided with a glass window 28.

A communication device 200E is installed inside the vehicle compartment of the vehicle 20. The communication device 200E employs the substantially same functional configuration as that of the communication device 200 according to the present embodiment illustrated in FIG. 1. As illustrated in FIG. 2, the communication device 200E is arranged at the ceiling part 23. By installing the communication device 200E at the ceiling part 23, it is possible to estimate the position of the portable device 100 in a wide range inside and outside the vehicle compartment.

In this regard, there is a case where a direct wave from the portable device 100 is shielded by other objects such as human bodies and baggage such a case where the portable device 100 is put in a back pocket of a user D who gets on the vehicle 20. In this case, a reflected wave that is the signal transmitted from the portable device 100 and reflected inside the vehicle compartment arrives at the communication device 200E arranged at the ceiling part 23. Hence, position estimation is performed based on the reflected wave.

More specifically, according to a distance measurement process of calculating a distance between the above-described portable device 100 and communication device 200E, the time ΔT2 from a transmission time of the first distance measurement signal to a reception time of the second distance measurement signal is measured, and the reception time of the second distance measurement signal is a reception time of a first arrival wave of the second distance measurement signal. The first arrival wave can be one of a direct wave, a delay wave, and a synthetic wave. The direct wave is a signal that is received by a reception side directly (that is, without being reflected or diffracted) via a shortest route of transmission and reception. The delay wave is a signal that is received by the reception side via a route of transmission and reception that is not the shortest, that is, indirectly by being reflected and diffracted. The delay wave is delayed compared to the direct wave, and is received by the reception side. The synthetic wave is a signal that is received by the reception side in a state where a plurality of signals having passed through a plurality of different routes are synthesized.

Therefore, the signal detected as the first arrival wave is not necessarily the direct wave. When the direct wave is shielded by a human body and the reflected wave is detected as the first arrival wave as described above, above measured ΔT2 includes a delay time. When ΔT2 is measured at a reception time of this delay wave, and a distance measurement process is performed by using this ΔT2, a wrong distance that is longer than an actual distance is calculated. Furthermore, when the above-described angle estimation process is performed based on the delay wave, too, a wrong angle is calculated. Hence, it is concerned that, for example, coordinates P10 illustrated in FIG. 2 are estimated as coordinates of the portable device 100, and it is wrongly decided that the portable device 100 exists outside the vehicle compartment. In this way, shielding caused by a human body becomes a cause of a decrease in precision of position parameter estimation of the portable device 100.

Hence, it is desirable that, even when the portable device 100 is put in a pocket of clothes or baggage inside the vehicle compartment, and a signal is shielded by the human body or the baggage, it is possible to more accurately estimate a position.

<<4. Technical Feature>>

Even when the portable device 100 is put in the pocket of clothes or the baggage inside the vehicle compartment according to an arrangement of the communication device 200 described in detail below, the control device 300 detects a direct wave as a first arrival wave. A case where a subject that detects the first arrival wave is the communication device 200 will be described as an example below. A process describe below may be executed by the portable device 100.

<4.1. Arrangement of Communication Device>

The communication device 200 is mounted on the vehicle 20. The communication device 200 is an example of a position fixed type communication device. The position fixed type communication device is a communication device whose relative position with respect to a target space that is a space partitioned by an object is fixed.

The vehicle compartment of the vehicle 20 is an example of the target space. In this regard, the vehicle compartment is a space provided to the vehicle 20 for the user to get on the vehicle 20. In a case where the target space is the vehicle compartment, an example of the object that partitions the target space is a component that makes up an outermost shell of the vehicle 20. The component that makes up the outermost shell of the vehicle 20 is a layer that is the most distant layer seen from the vehicle compartment among components that make up the vehicle compartment. An example of the component that makes up the outermost shell of the vehicle 20 is a steel plate that makes up a body of the vehicle 202, a steel plate that makes up doors, and glass windows that are fitted to the doors. Note that interior parts are applied using a resin to the vehicle compartment side of the steel plate that makes up the body and the steel plate that makes up the doors in some cases. These interior parts are also included in the vehicle compartment.

Figure 3:
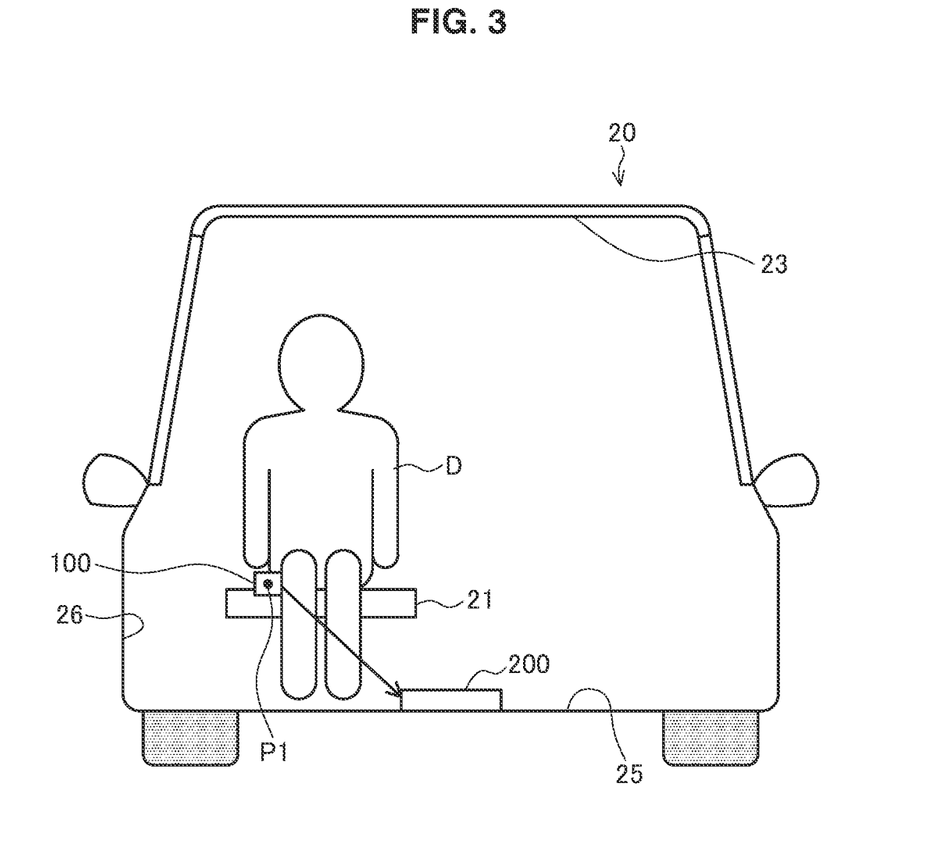
FIG. 3 is a view illustrating an example of an arrangement of a communication device according to the present embodiment.

FIG. 3 is a view illustrating an example of the arrangement of the communication device 200 according to the present embodiment. As illustrated in FIG. 3, a traveling direction of the vehicle 20 is also referred to as a front direction, and a direction opposite to the traveling direction of the vehicle 20 is also referred to as a back direction. Furthermore, a direction that is perpendicular to the traveling direction of the vehicle 20 and is horizontal to a ground is also referred to as a left-right direction. Furthermore, a direction that is perpendicular to the traveling direction of the vehicle 20 and is vertical to the ground is also referred to as an upper-lower direction. Furthermore, the vehicle 20 includes the ceiling part 23, the floor part 25, and the side parts as components that make up the outermost shell of the vehicle 20. The side parts include a side part 26 on the driver's seat side, a side part on a passenger's seat side, a side part on a front side of the vehicle 20, and a side part on a rear side of the vehicle 20.

The position fixed type communication device is fixed to a position that is closer to the floor part (in terms of a distance) than to the ceiling part inside the target space. According to this arrangement, even when the portable device 100 is put in the pocket of the clothes or the baggage inside the vehicle compartment, and a signal propagating in an upper direction of the vehicle compartment is shielded by the human body or the baggage, a direct wave from the portable device 100 arrives at the communication device 200. Consequently, the control section 320 of the control device 300 can estimate position parameters based on the direct wave, so that estimation precision improves. That is, it is possible to more accurately estimate the coordinates P1 of the portable device 100. For example, it is possible to appropriately decide that the portable device 100 exists inside the vehicle compartment. Note that the portable device 100 is an example of a position changeable type communication device. The position changeable type communication device is a communication device whose relative position with respect to the target space is changeable. The portable device 100 is carried by the user, and moves as the user moves. For example, the portable device 100 can be located inside the vehicle compartment or located outside the vehicle compartment.

As an example of the arrangement according to the present embodiment, as illustrated in, for example, FIG. 3, the communication device 200 may be arranged at a center part in the left-right direction of the floor part 25 inside the vehicle 20. Furthermore, the communication device 200 may be arranged at a part closer to one direction of the left and right directions of the floor part 25 (the driver's seat side or the passenger's seat side). Furthermore, the communication device 200 may be arranged at an end part on a front direction side of the floor part 25. Furthermore, the communication device 200 may be arranged at the end part on the front direction side of the floor part 25 and the center part in the left-right direction.

Furthermore, in another arrangement example according to the present embodiment, the communication device 200 may be arranged between the seat part and the floor part 25. The seat part includes a seat part 21 of a driver's seat, a seat part of a passenger's seat, and seat parts of rear seats. More restrictively, for example, the communication device 200 may be arranged between the seat part 21 of the driver's seat and the floor part 25. Furthermore, the communication device 200 may be arranged on a back side of the seat part 21 of the driver's seat.

Furthermore, in the another arrangement example according to the present embodiment, the communication device 200 may be arranged at a side part that connects the ceiling part 23 and the floor part 25, and at a position that is closer to the floor part than to the ceiling part. More restrictively, the communication device 200 may be arranged at a side part 26 on the driver's seat side that connects the ceiling part 23 and the floor part 25, and at a height below the seat part 21. For example, the communication device 200 may be arranged on a vehicle compartment inner side of a door included in the side part 26.

According to the above-described arrangement, when the position of the portable device 100 is estimated, it is possible to suppress wrong estimation that the portable device 100 is located inside the vehicle compartment even though the portable device 100 is actually located outside the vehicle compartment.

<4.2. Flow of Process>

Figure 4:
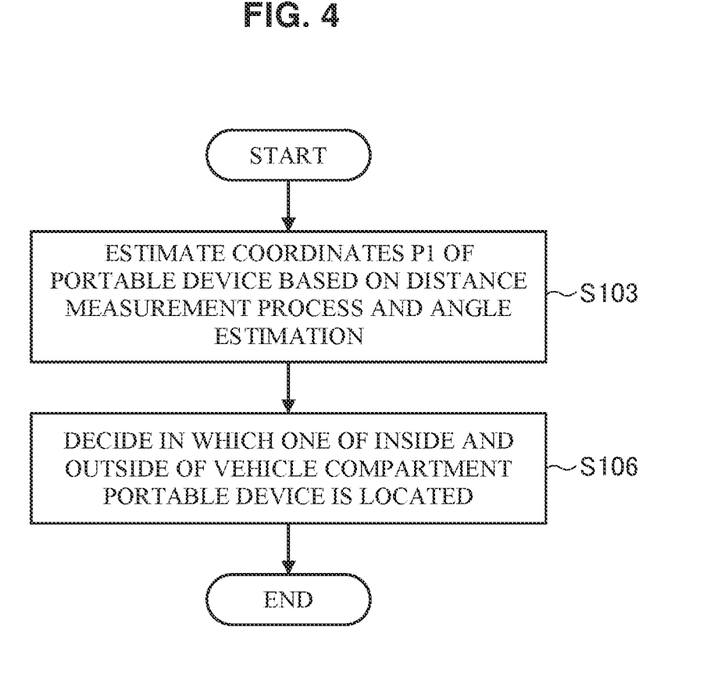
FIG. 4 is a flowchart illustrating an example of a flow of a position parameter estimation process executed by a control device according to the present embodiment.

FIG. 4 is a flowchart illustrating an example of a flow of a position parameter estimation process executed by the control device 300 according to the present embodiment.

As illustrated in FIG. 4, the control section 320 of the control device 300 first performs a distance measurement process and angle estimation based on information obtained by wireless communication performed between the communication device 200 and the portable device 100, and estimates the coordinates P1 (x, y, z) of the portable device 100 based on a calculated distance and angle (step S103). As described above, by devising the arrangement of the communication device 200, the direct wave from the portable device 100 arrives at the communication device 200, and the control device 300 can process the direct wave as the first arrival wave, so that precision of position estimation improves.

Next, the control section 320 decides in which one of an inside and an outside of the vehicle compartment the portable device 100 is located based on the estimated coordinates P1 (step S106). As described above, by devising the arrangement of the communication device 200, the direct wave from the portable device 100 arrives at the communication device 200, and the direct wave is processed as the first arrival wave, so that the control device 300 can correctly decide that the portable device 100 is inside the vehicle compartment.

<4.3. Decision that Portable Device is Located Outside Vehicle Compartment>

Figure 5:
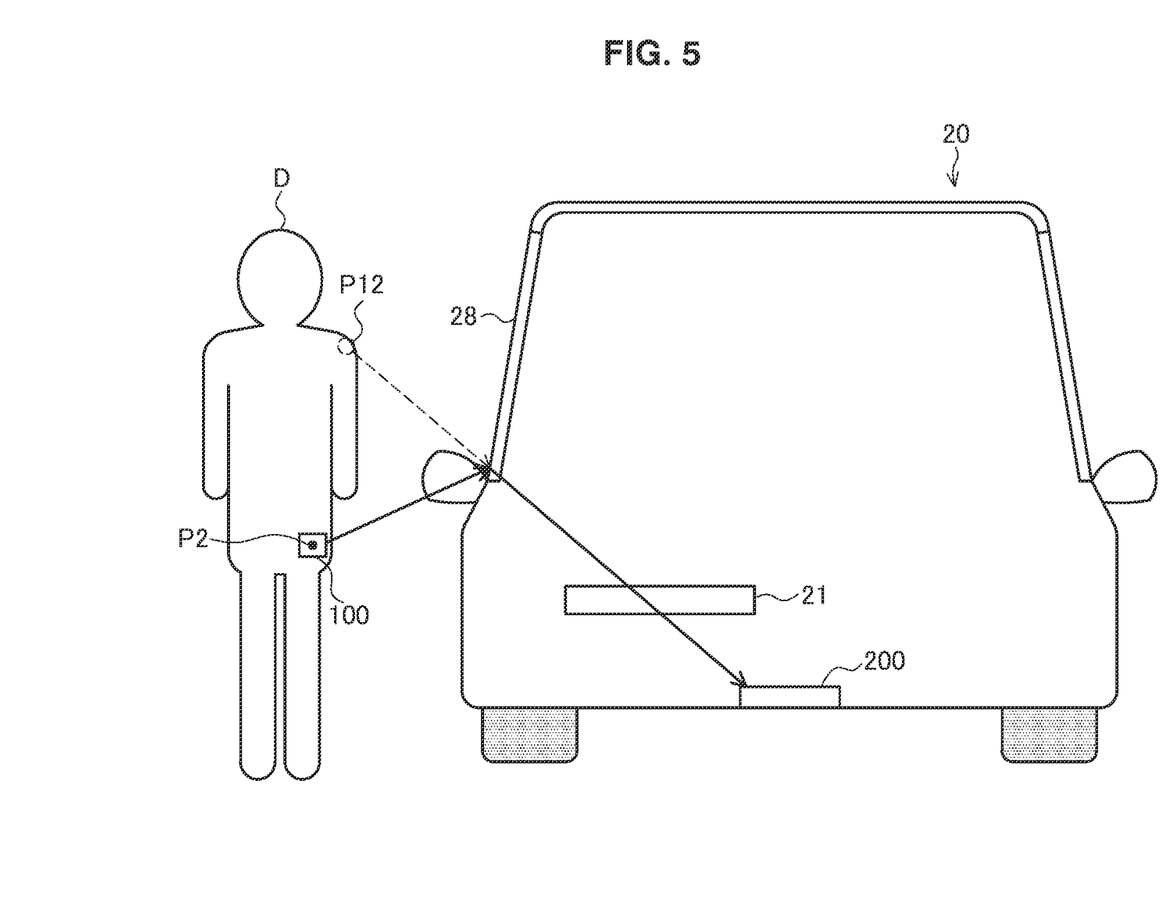
FIG. 5 is a view for explaining extra-vehicle compartment decision according to the present embodiment.

The arrangement of the communication device 200 according to the present embodiment makes it possible to perform intra/extra-vehicle compartment decision. This will be described below with reference to FIG. 5. FIG. 5 is a view for explaining extra-vehicle compartment decision according to the present embodiment.

According to the arrangement of the communication device 200 according to the present embodiment, there is a case where an area that enables accurate position estimation narrows compared to a case where the communication device 200 is arranged at the ceiling part 23. For example, the steel plate that makes up the body of the vehicle 20 or the steel plate that makes up the door shields the direct wave of the portable device 100 located in an extra-vehicle compartment area in a lower direction of the glass window. Thus, the control device 300 has difficulty in accurately estimating a position in the extra-vehicle compartment area in the lower direction of the glass window.

On the other hand, as illustrated in FIG. 5, a diffracted wave or a reflected wave of the portable device 10 located in the extra-vehicle compartment area in the lower direction of a glass window 38 can arrive at the communication device 200. When position estimation is executed based on this diffracted wave or reflected wave, although coordinates P12 different from the actual coordinates P1 of the portable device 100 are estimated, it is possible to correctly decide that the portable device 100 is located at least outside the vehicle compartment.

Consequently, the arrangement of the communication device 200 according to the present embodiment makes it possible to correctly perform intra/extra-vehicle compartment decision.

<<5. Supplementary Explanation>>

Although the preferred embodiment of the present invention has been described in detail with reference to the accompanying drawings, the present invention is not limited to this example. It should be understood by those who have common knowledge in the technical field to which the present invention belongs that it is obvious that various change examples or alteration examples can be arrived at within the scope of the technical idea recited in the claims, and these change examples and alteration examples also naturally belong to the technical scope of the present invention.

For example, although the above embodiment has described the example where the control device 300 calculates the distance measurement value, the present invention is not limited to this example. For example, the communication device 200 may calculate the distance measurement value. In this case, the control device 300 reports the information that indicates ΔT2 to the communication device 200.

Furthermore, although the above embodiment has described that the information that indicates the time ΔT1 from the reception time of the first distance measurement signal to the transmission time of the second distance measurement signal in the portable device 100 may be included in the data signal and transmitted to the communication device 200, the present invention is not limited to this example. The data signal only needs to include information related to the reception time of the first distance measurement signal and the transmission time of the second distance measurement signal.

Furthermore, although the above embodiment has described the example where the communication device 200 transmits the first distance measurement signal, the present invention is not limited to this example. For example, the portable device 100 may transmit the first distance measurement signal. In this case, when receiving the first distance measurement signal, the communication device 200 transmits the second distance measurement signal as a response to this first distance measurement signal. Furthermore, the communication device 200 transmits the data signal that includes the information that indicates the time ΔT1 from the reception time of the first distance measurement signal to the transmission time of the second distance measurement signal. On the other hand, the portable device 100 calculates the distance measurement value based on the time ΔT2 from the transmission time of the first distance measurement signal to the reception time of the second distance measurement signal, and the time ΔT1 included in the data signal. Note that the time ΔT1 may be known for the portable device 100.

Furthermore, although the above embodiment has described the example where the authenticatee is the portable device 100, and the authenticator is the communication device 200, the present invention is not limited to this example. Roles of the portable device 100 and the communication device 200 may be reserve, or may be dynamically switched. Furthermore, the communication devices 200 may measure a distance therebetween and authenticate each other.

Furthermore, although the distance is measured from the transmission time and the reception time of one round-trip communication between the portable device 100 and the communication device 200 according to the above embodiment, the present invention is not limited to this example. For example, a distance may be measured from a transmission time and a reception time of one-and-half round trip communication between the portable device 100 and the communication device 200. According to the one-and-half round trip communication between the portable device 100 and the communication device 200, for example, the portable device 100 first transmits a first signal, then the communication device 200 transmits a second signal in response to reception of the first signal, and the portable device 100 then transmits a third signal to the communication device 200 in response to reception of the second signal. The control device 300 can measure the distance between the portable device 100 and the communication device 200 from a transmission time and a reception time of each signal.

For example, although the above embodiment has described the example where the distance measurement value is calculated based on the propagation time, the present invention is not limited to this example. For example, a distance measurement value may be calculated based on a radio field intensity.

For example, although the above embodiment has described the example where the UWB is used as the wireless communication standards, the present invention is not limited to this example. In an example, wireless communication standards that use a signal of the RF band and a signal of the LF band may be used. In another example, wireless communication standards that use Wi-Fi (registered trademark), Near Field Communication (NFC), and infrared ray may be used.

For example, although the above embodiment has described the example where the control device 300 is configured as a separate device from the communication device 200 and is mounted on the vehicle 20, the present invention is not limited to this example. In an example, a communication unit including the control device 300 and the communication device 200 may be mounted on the vehicle 20. Furthermore, the function of the control section 320 of the control device 300 may be provided to the control section 220 of the communication device 200. Furthermore, the control device 300 may be included in the portable device 100. Furthermore, the control device 300 may be included in another device other than the portable device 100 and the communication device 200.

For example, although the above embodiment has described the example where the communication device 200 and the control device 300 are mounted on the vehicle, the present invention is not limited to this example. The communication device 200 and the control device 300 may be mounted on arbitrary movable bodies such as airplanes, ships, drones, and robots other than vehicles. In this regard, the movable bodies are devices that move.

For example, although the above embodiment has described the example where the present invention is applied to a smart entry system, the present invention is not limited to this example. The present invention is applicable to arbitrary systems that perform wireless communication. For example, objects used by the user include drones, vehicles, ships, airplanes, buildings (such as houses), robots, lockers, and home electric appliances. Furthermore, the present invention is applicable to, for example, pairs of two arbitrary devices among portable devices, vehicles, ships, airplanes, smartphones, drones, buildings, robots, lockers, and home electric appliances. Note that the pairs may include the two devices of the same type, and include the two devices of different types. In this case, one device operates as an authenticator side device, and an other device operates as an authenticatee side device.

Note that a series of processes of each device described in this description may be realized by using one of software, hardware, and a combination of the software and the hardware. Programs that configure the software are stored in advance in, for example, recording media (non-transitory media) provided inside or outside each device. Furthermore, each program is read on an RAM when, for example, executed by a computer, and is executed by a processor such as a CPU. The above recording media are, for example, a magnetic disk, an optical disk, a magneto-optical disk, and a flash memory. Furthermore, the above computer programs may be distributed via, for example, a network without using the recording media.

Furthermore, the process described using the flowchart and the sequence diagram in this description may not be necessarily executed in illustrated order. Some process steps may be executed in parallel. Furthermore, additional process steps may be adopted, or part of process steps may be omitted.

Furthermore, the effect described in this description is merely explanatory or exemplary, and is not limitative. That is, together with the above effect or instead of the above effect, the technology according to the present invention exhibits other effects that are obvious for those who have common knowledge in the technical field from the disclosure of this description.

REFERENCE SIGNS LIST 1 system
100 portable device
110 wireless communication section
120 control section
130 storage section
20 vehicle
200 communication device
210 wireless communication section
220 control section
230 storage section
240 intra-vehicle communication section
300 control device
310 intra-vehicle communication section
320 control section
330 storage section

The invention claimed is:

1. A control device comprising a control circuit configured to obtain a distance measurement value, and estimate a relative position of a position changeable communication device with respect to a target space based on the distance measurement value, the distance measurement value being obtained when a single position fixed communication device and the position changeable communication device perform wireless communication, and indicating a distance between the single position fixed communication device and the position changeable communication device, the single position fixed communication device being fixed to a position that is inside the target space that is a space partitioned by a vehicle, and an absolute distance from the single position fixed communication device to a floor part of the target space is smaller than an absolute distance from the single position fixed communication device to a ceiling part of the target space, and the relative position of the position changeable communication device with respect to the target space being changeable, wherein the relative position of the position changeable communication device is estimated relative to a three-axis coordinate system of the single position fixed communication device, wherein the control circuit obtains an angle at which a signal transmitted by the wireless communication from the position changeable communication device arrives at the single position fixed communication device and the distance measurement value only with respect to the single position fixed communication device, and estimates the relative position based on the obtained angle and the distance measurement value, wherein the angle is an angle formed between a straight line that connects an origin of a local coordinate system of the single position fixed communication device and the position changeable communication device, and coordinate axes of the local coordinate system, and wherein a first arrival wave is used for measurement, and wherein the control circuit processes a direct wave as the first arrival wave from the position changeable communication device, the direct wave being a signal received directly without being reflected or diffracted via a shortest route of transmission and reception, and estimates the relative position based on the direct wave to improve position estimation precision.

2. The control device according to claim 1,
wherein the control circuit decides whether or not the position changeable communication device is located interior of the target space of the vehicle based on an estimation result of the relative position of the position changeable communication device with respect to the target space.

3. The control device according to claim 2,
wherein the single position fixed communication device is mounted on the vehicle, and is arranged between a seat part and the floor part provided in the interior of the vehicle.

4. The control device according to claim 3,
wherein the single position fixed communication device is arranged at the floor part.

5. The control device according to claim 4,
wherein the single position fixed communication device is arranged at an end part of the floor part on a side of a traveling direction of the movable body.

6. The control device according to claim 4,
wherein the single position fixed communication device is arranged at an end part of the floor part on a side of a traveling direction of the movable body, and at a center of the floor part in a direction perpendicular to the traveling direction.

7. The control device according to claim 3,
wherein the single position fixed communication device is provided at a side part that connects the ceiling part and the floor part of the movable body, and at a height below the seat part.

8. The control device according to claim 1, wherein
the single position fixed communication device is mounted on the vehicle, the position changeable communication device is a device that a user who uses the vehicle carries to use, and the target space is a vehicle compartment that is a space provided to the vehicle for the user to get on the vehicle.

9. The control device according to claim 1, wherein, during the wireless communication performed by the single position fixed communication device and the position changeable communication device to obtain the distance measurement value, a signal that uses an Ultra-Wide Band (UWB) is transmitted and received.

10. A control system comprising:

a single position fixed communication device that is fixed to a position that is inside a target space that is a space partitioned by a vehicle, and an absolute distance from the single position fixed communication device to a floor part of the target space is smaller than an absolute distance from the single position fixed communication device to a ceiling part of the target space; and a control device configured to obtain a distance measurement value, and estimate a relative position of a position changeable communication device with respect to the target space based on the distance measurement value, the distance measurement value being obtained when the single position fixed communication device and the position changeable communication device perform wireless communication, and indicating a distance between the single position fixed communication device and the position changeable communication device, and the relative position of the position changeable communication device with respect to the target space being changeable, wherein the relative position of the position changeable communication device is estimated relative to a three-axis coordinate system of the single position fixed communication device, wherein the control circuit obtains an angle at which a signal transmitted by the wireless communication from the position changeable communication device arrives at the single position fixed communication device and the distance measurement value only with respect to the single position fixed communication device, and estimates the relative position based on the obtained angle and the distance measurement value, wherein the angle is an angle formed between a straight line that connects an origin of a local coordinate system of the single position fixed communication device and the position changeable communication device, and coordinate axes of the local coordinate system, and wherein a first arrival wave is used for measurement, and wherein the control circuit processes a direct wave as the first arrival wave from the position changeable communication device, the direct wave being a signal received directly without being reflected or diffracted via a shortest route of transmission and reception, and estimates the relative position based on the direct wave to improve position estimation precision.

11. A non-transitory computer readable storage medium that stores a program causing a computer to function as a control circuit configured to obtain a distance measurement value, and estimate a relative position of a position changeable communication device with respect to a target space based on the distance measurement value, the distance measurement value being obtained when a single position fixed communication device and the position changeable communication device perform wireless communication, and indicating a distance between the single position fixed communication device and the position changeable communication device, the single position fixed communication device being fixed to a position that is inside the target space that is a space partitioned by a vehicle, and an absolute distance from the single position fixed communication device to a floor part of the target space is smaller than an absolute distance from the single position fixed communication device to a ceiling part of the target space, and the relative position of the position changeable communication device with respect to the target space being changeable, wherein the relative position of the position changeable communication device is estimated relative to a three-axis coordinate system of the single position fixed communication device, wherein the control circuit obtains an angle at which a signal transmitted by the wireless communication from the position changeable communication device arrives at the single position fixed communication device and the distance measurement value only with respect to the single position fixed communication device, and estimates the relative position based on the obtained angle and the distance measurement value, wherein the angle is an angle formed between a straight line that connects an origin of a local coordinate system of the single position fixed communication device and the position changeable communication device, and coordinate axes of the local coordinate system, and wherein a first arrival wave is used for measurement, and wherein the control circuit processes a direct wave as the first arrival wave from the position changeable communication device, the direct wave being a signal received directly without being reflected or diffracted via a shortest route of transmission and reception, and estimates the relative position based on the direct wave to improve position estimation precision.

\* \* \* \* \*